United States Patent Office 3,078,646
Patented Feb. 26, 1963

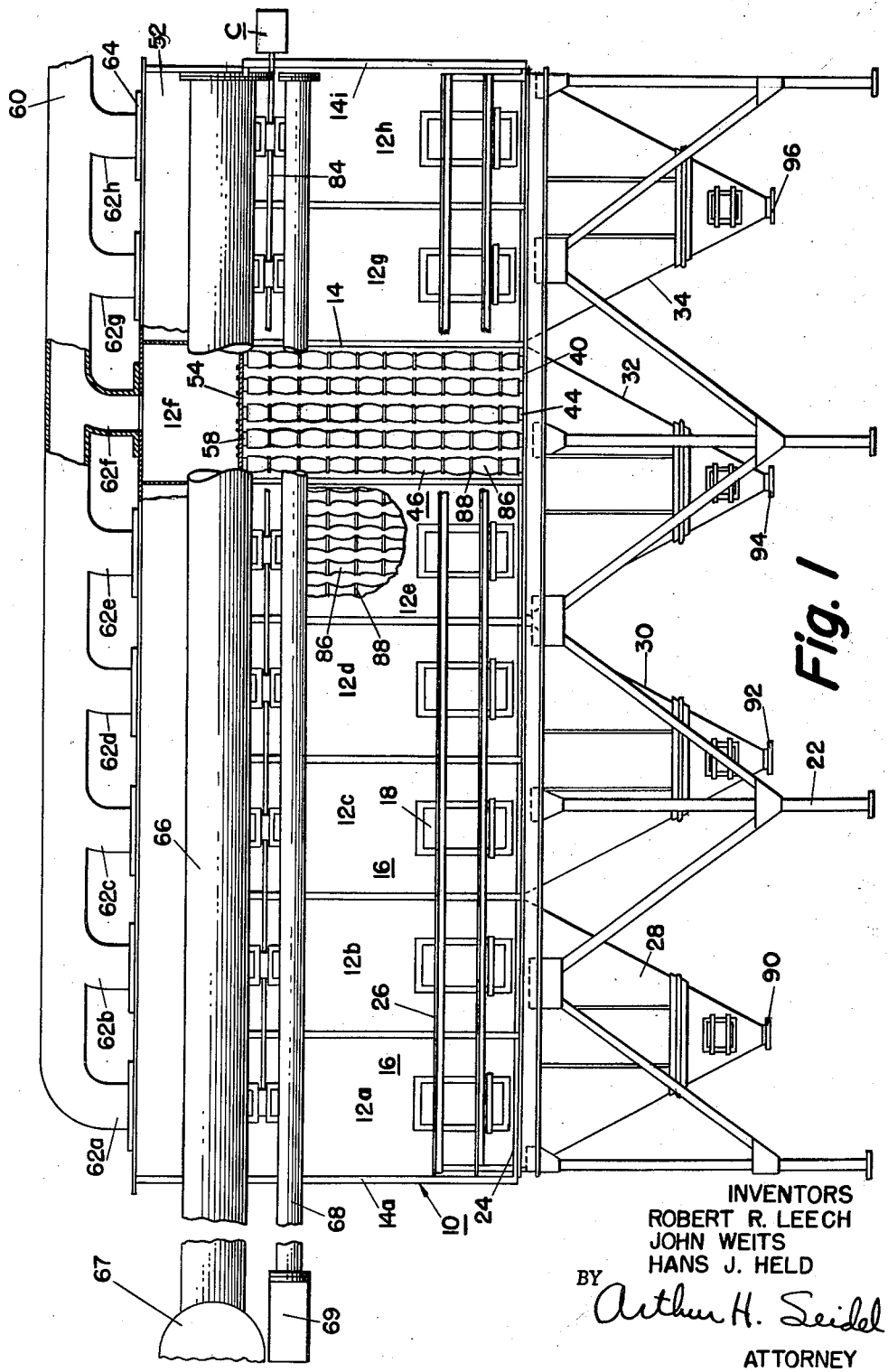

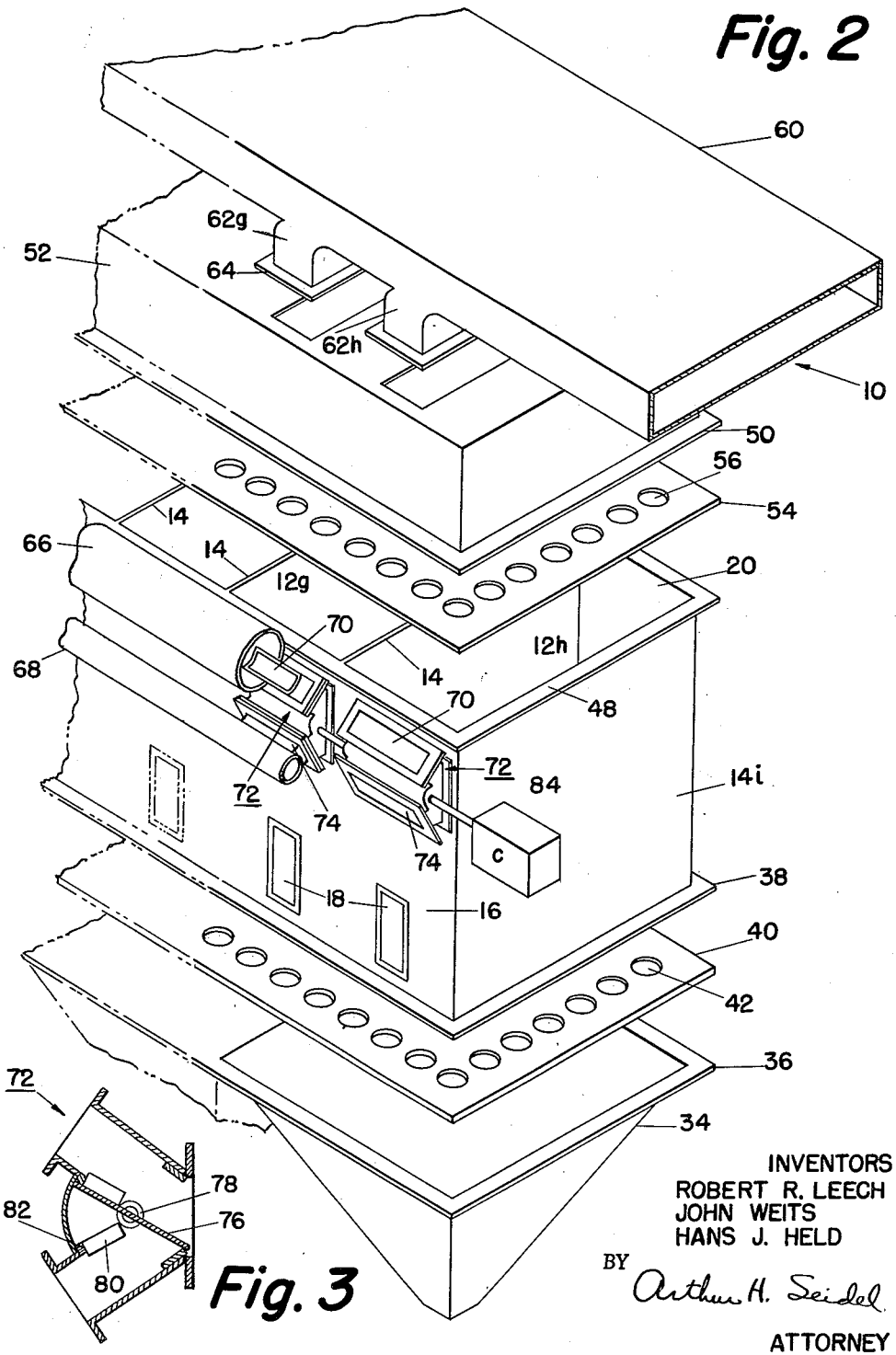

3,078,646
DUST COLLECTOR
Robert R. Leech, Huntington, John Weits, Westbury, and
Hans J. Held, Lake Success, N.Y., assignors to The
Ducon Company, Inc., Mineola, N.Y., a corporation of
New York
Filed July 21, 1958, Ser. No. 749,898
9 Claims. (Cl. 55—96)

The present invention relates to a dust collector; and more particularly to a highly efficient dust collector for removing very finely divided solid particles from air or other gases, which may be readily cleaned; and especially this invention provides a dust collector capable of removing extremely finely divided solids from a moisture saturated air stream, which dust collector may be readily disgorged of filtered particles and operated continuously.

A wide variety of dust collectors have heretofore been designed for the removal of dust particles from air and other gases. In particular, a wide variety of dust collectors are presently available which comprise cloth filters, and which remove dust particles from the air by the passage of the air through the cloth filters. However, experience has demonstrated that present dust collectors which are dependent upon filter cloths are incapable of functioning satisfactorily in problem situations where the removal of extremely fine dust particles from moisture saturated air is necessary. While present filter cloths which can satisfactorily filter extremely fine dust particles are commercially available, the means heretofore suggested for cleaning such filter cloths are not entirely satisfactory or are of relatively high expense when compared with other filtering operations. Thus, in problem situations involving very fine dusts there is a progressive build-up of the dust particles upon the filter cloth, when ordinary cleaning techniques are used, which build-up leads to the prevention of the free passage of air through the filter cloth, ultimately rendering the filter cloth useless for its intended purpose.

A wide variety of suggestions have been made to solve the problem of filtering fine dusts carried by a moisture saturated air stream and the cleaning of the filter unit used for such filtration. Thus, filter cloth units have been constructed in which the filter cloth is periodically mechanically rapped and/or shaken. However, this does not remedy the situation since clogging of the pores of the filter cloth is not obviated by conventional mechanical rapping and/or shaking procedures. Furthermore, even though the surface portion of the deposited filter cake is removed, the residuum cake resulting from finely divided dust particles will adversely affect the air capacity of the filter by virtue of the higher resistance of the filter to the passage of air as measured by the pressure drop across the filter cloth. Since in many commercial installations it is a necessity that the air capacity of a filter be constant, this failing of prior dust collector units is a most serious one.

Moreover, the maintenance requirements for prior mechanical rapping and shaking operations are high. Thus, such techniques abuse the filter cloth and markedly reduce its useful on-stream operating life.

This invention has as an object the provision of a dust collector capable of removing finely divided dust particles from an air stream.

This invention has as another object the provision of a dust collector comprising a filter cloth in which facile cleaning of the filter cloth is effected.

This invention has as another object the provision of a dust collector which may be operated continuously with a relatively small change in pressure drop across the filter cloth.

This invention has as another object the provision of a dust collector which may be operated at high air to filter material ratios, requiring a relatively low filter area per given volume of air, and hence requiring smaller size equipment for a given capacity.

This invention has as another object the provision of a dust collector capable of removing finely divided dust particles from a moisture laden air stream, and from an air stream that is saturated with moisture.

This invention has as another object the provision of a dust collector in which the filtered dust is discharged into a hopper without subsequent disturbance of such filtered dust.

This invention has as another object the provision of a dust collector for removing finely divided dust particles from an air stream while being maintained at an almost constant air capacity.

This invention has as yet a further object the provision of a dust collector which is capable of being operated most efficiently with a minimum of maintenance and at very low power requirements.

Other objects will appear hereinafter.

For the purpose of illustrating the invention there is shown in the drawings a form which is presently preferred; it being understood, however, that this invention is not limited to the precise arrangements and instrumentalities shown.

Referring to the drawings, wherein like reference characters refer to like parts:

FIGURE 1 is an elevational view of one embodiment of the dust collector of the present invention, with parts being broken away to reveal the operation of such dust collector.

FIGURE 2 is an exploded view of a portion of the dust collector shown in FIGURE 1.

FIGURE 3 is a sectional view of a valve embodiment used in the dust collector of the present invention taken on line 3—3 of FIGURE 2.

The dust collector of the present invention is designated generally as 10. Dust collector 10 includes a plurality of filter compartments 12, eight such filter compartments being shown in the illustrated embodiment of the dust collector 10, namely filter compartments 12a, 12b, 12c, 12d, 12e, 12f, 12g, and 12h. While a smaller or a larger number of filter compartments may be utilized in the dust collector of our invention than is shown in here-illustrated dust collector 10, as will be explained more fully below, it is absolutely essential that the dust collector of the present invention include at least two compartments, and preferably that the dust collector of the present invention include more than two compartments if maximum efficiency and maintenance of constant air capacity is desired.

The filter compartments 12 are separated from each other by imperforate partitions 14 which extend crosswise across the dust collector 10 at spaced intervals. The partitions 14a and 14i at the respective outside ends of filter compartments 12a and 12h comprise the end walls of the dust collector 10.

The sides 16 of the filter compartments 12 may be provided with doors 18 through which access for cleaning and maintenance may be had to each of the filter compartments 12.

The back walls 20 of the filter compartments 12 are imperforate, although, if desired, such back walls 20 may be provided with access doors, similar to doors 18 of sides 16.

As seen particularly in FIGURE 1, the filter compartments 12 are maintained spaced above the ground by means of the support frame 22, which comprises a structural network formed from beams and tubing of great structural strength. A platform 24 is provided on frame 22 for securing access to the doors 18 in sides 16 of filter compartments 12. The platform 24 is provided with railing 26.

Hoppers for dust collector 10 are provided beneath the filter compartments 12, one hopper being provided for each pair of adjacent filter compartments. Thus, hopper 28 is provided for filter compartments 12a and 12b; hopper 30 is provided for filter compartments 12c and 12d; hopper 32 is provided for filter compartments 12e and 12f; and hopper 34 is provided for filter compartments 12g and 12h.

Each of the hoppers 28, 30, 32, and 34 is an inverted hollow pyramid having a flange 36 disposed about its uppermost edge, which flange 36 is matingly secured to a flange 38 which extends around the bottommost edge of the filter compartments 12a, 12b, 12c, 12d, 12e, 12f, 12g, and 12h.

The bottom tube plate 40 is disposed intermediate the flanges 36 and 38. Bottom tube plate 40 comprises a metal plate having spaced parallel regular rows of circular openings extending both lengthwise and crosswise. Such openings 42 may be threaded and receive the bottom nipple 44 of the filter cloth tube 46 which is carried upon the bottom tube plate 40. A more detailed description of the filter cloth tube 46 will be set forth below.

A flange 48 is provided on the uppermost edges of the filter compartments 12a, 12b, 12c, 12d, 12e, 12f, 12g, and 12h. This flange 48 is mated with the flange 50 which is carried on the periphery of the dust inlet duct 52 which is disposed above the filter compartments 12a, 12b, 12c, 12d, 12e, 12f, 12g, and 12h. The top tube plate 54 is disposed intermediate the flanges 48 and 50. Top tube plate 54 comprises a series of parallel spaced circular openings extending regularly both lengthwise and crosswise, which openings 56 are disposed in identical alignment with the openings 42 in bottom tube plate 40.

As seen in FIGURE 1 the top nipple 58 of each filter cloth tube 46 is carried on the top tube plate 54. Thus, the top nipple 58 may be provided with an annular flange which engages the uppermost surface of the top tube plate 54, with the top nipple 58 extending through the opening 56 in such top tube plate 54.

The dust inlet manifold 60 is secured to the uppermost surface of the dust inlet duct 52. Dust inlet manifold 60 is provided with conduits 62 which depend from the dust inlet manifold 60 and are secured to the uppermost surface of the dust inlet duct 52. A single conduit 62 is provided for each of the filter compartments 12. Thus, conduit 62a is provided for filter compartment 12a; conduit 62b is provided for filter compartment 12b; conduit 62c is provided for filter compartment 12c; conduit 62d is provided for filter compartment 12d; conduit 62e is provided for filter compartment 12e; conduit 62f is provided for filter compartment 12f; conduit 62g is provided for filter compartment 12g; and conduit 62h is provided for filter compartment 12h. Each of the conduits 62 is provided with a flange 64 at its lowermost edge, which flange 64 is received on the uppermost surface of the dust inlet duct 52.

The clean air outlet duct 66 is secured to the sides 16 of the filter compartments 12 and is in communication with each of the filter compartments 12a, 12b, 12c, 12d, 12e, 12f, 12g, and 12h. Such clean air outlet duct 66 is secured to a vacuum pump designated diagrammatically as 67. The vacuum pump 67 must be of sufficient size to provide for the pressure drop of dust laden air introduced from dust inlet manifold 60 which passes through the filter cloth tubes 46 in the compartments 12.

Backwash air duct 68 is provided on the sides 16 of the filter compartments 12 beneath the clean air outlet duct 66. The backwash air duct 68 may open directly into the atmosphere, but preferably where the degree of moisture within the dust collector 10 is to be regulated, the backwash air duct 68 should be supplied with air of controlled humidity from reservoir 69.

The relative arrangement of clean air outlet duct 66 and backwash air duct 68 to the filter compartments 12 will be described for filter compartments 12g (see in particular FIGURE 2) but it is to be understood that an identical mode of attachment for the clean air outlet duct 66 and the backwash air duct 68 applies for the remaining filter compartments.

The clean air outlet duct 66 is secured to the side 16 of filter compartment 12g by engaging the outlet duct 70 of air reversal valve 72. The backwash air duct 68 is secured to the side 16 of filter compartment 12g by engagement with the backwash duct 74 of air reversal valve 72. As shown in FIGURE 2 suitable flanges may be provided on clean air outlet duct 66 and outlet duct 70 to secure mating therebetween, and suitable flanges may be provided on backwash air duct 68 and backwash duct 74 to secure mating therebetween.

Air reversal valve 72 (see in particular FIGURE 3) comprises a flap valve in which access between the interior of filter compartment 12g and either the outlet duct 70 or the backwash duct 74 may be controlled by means of the flap 76 which is pivoted on the center shaft 78. A wide variety of commercial air reversal valves are presently available which may be suitable for functioning as air reversal valve 72. In the illustrated embodiment the flap is provided with members 80 which seat against valve seats in the housing 82 of the air reversal valve 72.

The sequential opening and closing of the several air reversal valves 72, one such air reversal valve 72 being provided for each of the filter compartments 12a, 12b, 12c, 12d, 12e, 12f, 12g, and 12h, may be controlled by any one of a variety of suitable electrical or mechanical control mechanisms whose structure forms no part of the present invention. Thus, the control mechanism C shown in FIGURE 2 as being mounted on the end wall 14i sequentially regulates the air reversal valves 72, such control mechanism C being connected to each of the air reversal valves 72 by the conduit 84. In the illustrated embodiment the control mechanism C has been set so that when one of the air reversal valves 72 is open to the backwash air duct 68 the remaining seven air reversal valves will be open to the clean air outlet duct 66. Thus, when the air reversal valve 72 for the filter compartment 12a is open to the backwash air duct 68, and closed to the clean air outlet duct 66, the air reversal valves for the filter compartments 12b, 12c, 12d, 12e, 12f, 12g, and 12h are each open to the clean air outlet duct 66 and closed to the backwash air duct 68.

The time period during which a filter compartment may be in communication with the backwash air duct 68 comprises the cleaning phase for such filter compartment. During such cleaning phase time period, the filter compartment 12a undergoes its cleaning. This is accomplished by the control C effecting the backwash cleaning operation described in detail below in respect to filter compartment 12e.

When a predetermined time passes, the cleaning phase for compartment 12a is concluded and its filter cloth tubes are substantially clean. The control C will then rotate the flap 76 for the air reversal valve 72 for filter compartment 12a so that such air reversal valve 72 is open to the clean air outlet duct 66. Thereafter the control C will operate the air reversal valve for the filter compartment 12b so that the flap is rotated so that such air reversal valve is in communication with the backwash air duct 68. The remaining filter compartments 12c, 12d, 12e, 12f, 12g, and 12h remain in communication with the clean air outlet duct 66. Upon the completion of the predetermined time interval during which tne filter compartment 12b undergoes its cleaning phase, the control C rotates the flap 76 of the air reversal valve 72 for the filter compartment 12b so that such filter compartment 12b is again in communication with clean air outlet duct 66. Subsequently, the control C rotates the flap 76 for the air reversal valve 72 of the filter compartment 12c so that the filter compartment 12c is in communication with the backwash air duct 68. The remaining filter compartments 12a, 12d, 12e, 12f, 12g, and 12h remain in communication with the clean air outlet duct 66.

The aforesaid operation is repeated by the control C sequentially until each of the filter compartments 12a, 12b, 12c, 12d, 12e, 12f, 12g, and 12h have been in communication with the backwash air duct and undergone their cleaning phase. The sequential cycle is repeated with first the air reversal valve 72 for filter compartment 12a being open to the backwash air duct 68 while the remaining filter compartments 12b, 12c, 12d, 12e, 12f, 12g, and 12h are in communication with the clean air outlet ducts 66, with the further cycle continued at predetermined time intervals comprising the cleaning phase of each filter compartment in the sequence heretofore indicated.

In the stage illustrated in FIGURE 1, the cleaning phase for filter compartment 12e is illustrated. Thus, the air reversal valve 72 for filter compartment 12e is open to the backwash air duct 68 while the air reversal valves 72 of the remaining filter compartments 12a, 12b, 12c, 12d, 12f, 12g, and 12h are open to the clean air outlet duct 66. As heretofore noted, the filter compartments 12e and 12f are mounted above the hopper 32. The filter cloth tubes 46 for filter compartments 12e and 12f will be described below, but it is to be understood that the filter cloth tubes 46 for the remaining filter compartments 12a, 12b, 12c, 12d, 12g, and 12h are identical with those of the filter compartments 12e and 12f.

The filter cloth tubes 46 comprise sleeves formed of woven cotton sateen fabric or other suitable filter cloth material, which sleeves 86 are press-fitted and clamped over the bottom nipple 44 which is retained in the bottom tube plate 40 and over the top nipple 58 which is retained in the top tube plate 54. Positive engagement between the nipples 44 and 58 and the sleeve 86 may be achieved by conventional snap action tube clamps or bands. A plurality of metal spreader rings 88 are provided at spaced intervals, such as at intervals of about eighteen inches, along the length of the sleeves 86. We have found that there is an important relationship for optimum performance between the internal diameter of the sleeves 86 and their length, namely that within the internal diameter ranges most useful for industrial purposes, namely an internal diameter of between about four inches to fourteenth inches, for optimum performance the length of the sleeve 86 should be between about ten times to about fourteen times and preferably about twelve times the internal diameter of such sleeve 86. For example, in the case of a sleeve having an internal diameter of ten inches, such sleeve should have an overall length of about ten feet.

In operation in the stage shown in FIGURE 1 filter compartment 12f (and also filter compartments 12a, 12b, 12c, 12d, 12g, and 12h) is in communication with clean air outlet duct 66 and hence with vacuum pump 67. Thus, dust laden air enters downwardly from dust inlet manifold 60 through conduit 62f into filter compartment 12f and through the filter cloth tubes 46 from which it passes outwardly to the clean air outlet duct 66. As shown in FIGURE 1, this causes the bellying outwardly of the filter cloth tubes 46. The suspended particles carried by the dust laden air are caught on the inner wall surface of the sleeve 86 of each of the filter cloth tubes 46, with the filtered air passing from the filter cloth tubes 46 to the clean air outlet duct 66 in the manner heretofore indicated.

It is to be emphasized that the passage of the dust laden air is downwardly and that this downward passage plus the normal action of gravity results in the dust particles undergoing the maximum urgement towards the hopper 32 with the suppression of opposing and disturbing forces on such dust particles.

Simultaneously with the aforesaid filtering operation, filter compartment 12e is in communication through its air reversal valve 72 with the backwash air duct 68 and is undergoing its cleaning phase. This causes air from the atmosphere to be drawn into filter compartment 12e passing through the filter cloth tubes 46 in such filter compartment 12e. This passage of atmospheric air through the filter cloth tubes 46 of filter compartment 12e effects the flexing of such filter cloth tubes 46, as shown in FIGURE 1. The spreader rings 88 prevent the blockage of the filter cloth tubes 46 since it is not possible for the sleeve 86 of each of the filter cloth tubes 46 in the region of each spreader ring to completely collapse. Simultaneously with the flexing of the filter cloth tubes 46 in filter compartment 12e there is the release of the filtered material which has been deposited as a cake or the like on the internal wall surface of each sleeve 86 and from the pores of each of the filter cloth tubes 46 into the hopper 32. During the predetermined time period in which filter compartment 12e is undergoing its cleaning phase, namely the removal of the filter cake from the inside wall surface of the sleeves 86 of its filter cloth tubes 46, the control C should repetitively and rapidly automatically operate air reversal valve 72 for the filter compartment 12e in such manner as to open such filter compartment 12e to clean air outlet duct 66 after the same has been in communication with backwash air duct 68 so as to permit the filter cloth tubes 46 of filter compartment 12e to belly outwardly, and then shortly thereafter again place filter compartment 12e in communication with backwash air duct 68 so as to flex the filter cloth tubes 46 within the filter compartment 12e. This sequence of rapidly placing the filter compartment 12e in communication with the backwash air duct 68 and then with the clean air outlet duct 66 during the predetermined time interval comprising the cleaning phase period for filter compartment 12e should be effected several times, such as three or four times to perhaps six or seven times. The reversal operation of valve 72 should be rapid so that the communication between the clean air outlet duct 66 and the filter cloth tubes 46 will be but of momentary duration. Similarly, the communication between the backwash air duct 68 and the filter cloth tubes 46 will be but of momentary duration. This will provide a plurality of rapid snappings of the sleeve 86 of each of the filter cloth tubes 46 within filter compartment 12e insuring substantially complete removal of the filter cake from such sleeves 86 by virtue of the wave-like motion of the sleeve 86 during such snappings.

The removal of the filter cake from the sleeves 86 of the filter cloth tubes 46 is to the hopper 32 since not only is the filter cake downwardly directed by the action of gravity but the dust inlet manifold 60 and its conduits 62 are so designed as to downwardly direct the air which enters into filter compartment 12e from backwash air duct 68. Thus, air which enters into filter compartment 12e from backwash air duct 68 should be directed downwardly, so that it will carry with it filtered material from within the filter cloth tubes 46 of filter compartment 12e to the hopper 32. It is undesirable for such air to rise upwardly, joining the dust laden air stream within the dust inlet manifold 60, since this reduces the efficiency of the dust collector 10, as such dust will be carried from one filter compartment to another, rather than being removed from dust collector 10 through the hoppers 28, 30, 32, and 34 thereof, and specifically through the outlet gate valves 90, 92, 94, and 96 of such hoppers.

The presence of the chamber in dust inlet duct 52 above the top tube plate 54, and the rapid decrease in internal cross-section between such chamber and the internal diameter of the conduits 62 from dust inlet manifold 60 results in the creation of a quiescent region in such chamber with the flow of air from the backwash air duct 68 being substantially entirely diverted from the sleeves 86 of the filter cloth tubes 46 to the hopper 32. This renders the operation of dust collector 10 very efficient, since the loss in efficiency arising due to the carry-over of dust laden air from filter compartment 12e into dust inlet manifold 60 is substantially entirely eliminated. Instead, the air from backwash air duct 68 passes through the filter cloth tubes 46 in filter compartment 12e and thence through the hopper 32 into the filter cloth tubes 46 of filter compartment 12f and out of such filter cloth tubes 46 into clean air outlet duct 66 and vacuum pump 67.

Since in the operation of the dust collector 10 of the present invention seven filter compartments are always in operation filtering dust laden air while the remaining filter compartment is being disgorged of its filter cake contents, pulsation of operation of the dust collector 10 is minimized.

Since the aforesaid method of disgorgement of filter cake is exceptionally efficient, the air capacity of the dust collector 10 may be kept constant since high resistance to air flow through the filter cloth tubes would be avoided.

The dust collector 10 of the present invention is exceptionally suited for difficult filtration operations where high efficiency is needed and where the chemical nature of the dust particles, their size, and/or the presence of adverse moisture characteristics render efficient filtration exceedingly difficult.

The dust collector of the present invention is devoid of the maintenance problems connected with prior dust collectors whose cleaning action is dependent upon shaking mechanisms and/or compressed air cleaning rings. The positive cleaning action allows continuous operation with relatively smaller change in pressure drop across the filter resulting in continuous air handling capacity.

Moreover, the cleaning effected during the cleaning phase, while positive, does not over-stress the filter cloth. This greatly increases the life of the filter cloth tubes. Due to the positive cleaning action, it is possible to operate at high air to filter material ratios, which means less square feet of filter area per given volume of air, and hence smaller size equipment for a given capacity.

The present invention may be embodied in other specific forms without departing from the spirit or essential attributes thereof and, accordingly, reference should be made to the appended claims, rather than to the foregoing specification as indicating the scope of the invention.

We claim:

1. A dust collector comprising a plurality of upright filter compartments, upright filter cloth tubes within each of said compartments, each of said filter cloth tubes being open at its top and bottom ends, means associated with each filter cloth tube for preventing its collapse, hoppering means beneath said filter compartments, said hoppering means including a common hopper beneath at least two adjacent filter compartments, said common hopper being in communication with the interior of the filter cloth tubes of its filter compartments, a common duct for introducing dust laden gas to the top open ends of said filter cloth tubes, said common duct being disposed above said filter compartments, a chamber for each filter compartment in communication with said common duct and the filter cloth tubes of its filter compartment, a fixed restriction intermediate said common duct and each chamber, exhaust means for evacuating gases from said filter compartments in communication with each of said filter compartments, gas inlet means for introducing gases to said filter compartments in communication with each of said filter compartments, valve means intermediate each filter compartment and said exhaust means and intermediate each filter compartment and said gas inlet means, said valve means permitting each filter compartment to be in communication with either said exhaust means or said gas inlet means, and control means for opening the valve means of one filter compartment to said gas inlet means while maintaining the at least one other filter compartment which is in communication with the hopper common to both said one filter compartment which is in communication with said gas inlet means and said other filter compartment in communication with said exhaust means.

2. A dust collector in accordance with claim 1 wherein said restriction comprises a conduit angularly disposed in respect to said common duct, said conduit having an internal cross-sectional area which is appreciably less than the internal cross-sectional area of each of said chambers.

3. A dust collector in accordance with claim 1 wherein the means for preventing the collapse of said filter cloth tubes includes spreader rings carried by said tubes at spaced points along their length.

4. A dust collector in accordance with claim 1 wherein the valve means associated with each filter compartment and its exhaust means and gas inlet means comprises a single valve operatively associated with said control means in a manner so that said control means rapidly and repetitively switches said one filter compartment from being in communication with said gas inlet means to being in communication with said exhaust means a plurality of times thereby causing a portion of the tubes to alternately collapse and be bellied outwardly.

5. In a dust collector comprising a plurality of upright filter compartments, upright filter tubes mounted within each of said compartments, said tubes being open at both ends, means associated with each tube for preventing its complete collapse, a chamber above the filter tubes in each compartment, a common dust duct, said dust duct being in communication with each chamber at all times for introducing dust laden gas to each compartment, a fixed restriction between each compartment and said common dust duct, a common clear air duct in communication with each compartment for withdrawing clean air, a common backwash duct in communication with each compartment for introducing air into each compartment, and a single valve means between each compartment and the clean air and backwash ducts, each valve means having one port in communication with a compartment and a separate port in communication with each of said clean air and backwash ducts.

6. In a dust collector in accordance with claim 5 including a control mechanism for sequentially regulating each of said valve means so that each compartment is selectively in communication with either said backwash or said clean air ducts, said backwash and clean air ducts being positioned adjacent one end of each compartment so as to direct the flow of fluids therefrom toward a hopper mounted below said tubes.

7. A dust collector in accordance with claim 6 wherein each valve means includes a single valve member controlling flow through said ports, and said control mechanism oscillates said valve members thereby placing said compartments in alternating communication with said clean air and backwash ducts thereby causing an alternating inward and outward pulsating of portions of said tubes.

8. A process for dust collection which comprises passing a dust laden gas stream from a region of relatively high pressure downwardly through a plurality of filter tubes, passing the downwardly directed gas stream from the interior of the tubes through the tube walls to an exterior region of relatively low pressure while simultaneously capturing the dust carried by said stream on the interior walls of said filter tubes and in a chamber beneath said filter tubes, and cleaning some of the filter tubes while capturing dust with the remainder of said filter tubes while all of said tubes are in communication with said region of relatively high pressure, said cleaning step including passing cleaning gas from a region of relatively high pressure through the exterior of said filter tubes being cleaned in a downward direction toward said chamber below said tubes being cleaned, rapidly and repetitively interrupting the passing of said cleaning gas and reducing the pressure to which said tubes being cleaned are subjected so as to cause said tubes being cleaned to pulse rapidly inwardly and outwardly in a radial direction, and forming a quiescent region between the tubes being cleaned and said first mentioned region of high pressure thereby diverting said dust laden gas stream to the remainder of said filter tubes.

9. A process in accordance with claim 8 including the step of controlling the humidity of the cleaning gas within predetermined limits.

References Cited in the file of this patent

UNITED STATES PATENTS

| | | |
|---|---|---|
| 1,628,601 | Feind | May 10, 1927 |
| 1,784,339 | Clasen et al. | Dec. 9, 1930 |
| 1,974,952 | Eiben | Sept. 25, 1934 |

FOREIGN PATENTS

| | | |
|---|---|---|
| 401,186 | Germany | Aug. 29, 1924 |